Patented Jan. 7, 1947

2,413,803

UNITED STATES PATENT OFFICE 2,413,803

2-ETHYL-2-BUTYL PROPANEDIOL-1,3

Samuel W. Tribit, Darien, Conn., assignor, by mesne assignments, to U. S. Industrial Chemicals, Inc., New York, N. Y., a corporation of Delaware No Drawing. Application June 22, 1945, Serial No. 601,055

1 Claim. (Cl. 260—635)

This invention relates to 2-ethyl-2-butyl propanediol-1,3 and to an insect-repellent composition comprising this diol as an essential ingredient.

The object of the present invention is to provide an improved insect-repellent composition which is readily applicable to the skin and which is capable of repelling various disease-bearing insects such as certain types of flies and mosquitoes for prolonged periods of time.

2-ethyl-2-butyl propanediol-1,3 can be prepared by reacting formaldehyde and 2-ethyl hexanal, in the presence of an alkaline substance, in accordance with the following equation:

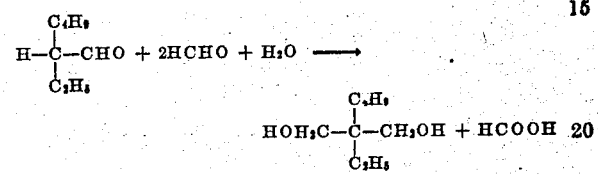

The following example represents a typical preparation of this dihydroxy alcohol or diol:

To a mixture of 384 grams of 2-ethyl hexanal and 486 grams of 37% formaldehyde solution there are added, slowly and with stirring, 1400 cc. of ethyl alcohol containing 187 grams of potassium hydroxide in solution. The mixture is stirred and maintained at 15–30° C. for 16 hours. The excess potassium hydroxide in then neutralized by introducing gaseous carbon dioxide into the mixture. The resulting precipitate is removed by filtration, and the filtrate is heated under reduced pressure to remove the alcohol. The alcohol-free residue is then dissolved in ether and the ether solution is washed several times with water and then dried by means of anhydrous sodium sulfate. The ether is removed by gentle heating, and the residue is distilled under reduced pressure. A colorless, viscous liquid boiling at 140° C. at 10 mm. pressure is obtained in 73% yield. On standing several hours, the liquid crystallizes to a white solid having a melting point of 39.5° C.

A determination of the carbon and hydrogen content of the solid shows that it conforms with the composition of 2-ethyl-2-butyl propanediol-1,3:

|   | Per cent calculated | Per cent found |
|---|---|---|
| C | 67.5 | 67.2 |
| H | 12.5 | 12.5 |

To further confirm the composition of the product, a portion of the solid is esterified with acetic acid, and a liquid fraction having the following properties is obtained by distillation: Sp. gr. at 20° C./20° C.=0.9776; B. P. 139° C. at 10 mm. That this ester is the diacetate of 2-ethyl-2-butyl propanediol-1,3 is confirmed by the following analytical data:

|   | Calculated | Found |
|---|---|---|
| Saponification equiv | 122.2 | 122 |
| Carbon per cent | 64.0 | 64.1 |
| Hydrogen do | 9.8 | 10.1 |

This diol has been found to possess unexpected and excellent insect-repellent properties, particularly with respect to Aedes aegypti, a fly which carries yellow fever germs. Tests have established that this diol repels Aedes aegypti for an average period of 226 minutes. 2-ethyl-2-butyl propanediol-1,3 also has a repellent effect with respect to Anopheles quadrimaculatus, which effect, while not as pronounced as that against Aedes aegypti, nevertheless makes it useful against malarial mosquitoes.

This diol is soluble in the usual organic solvents and may be dissolved therein for the purpose of application to the skin. For example, ethyl alcohol and propylene glycol are suitable solvents. Any solvent which does not attack the skin may be used. The diol may be used alone or in conjunction with other insect repellents. Suitable combinations may be made with the alkyl phthalates such as dimethyl phthalate, with 2-ethyl hexanediol-1,3, or with Indalone.

2-ethyl-2-butyl-propanediol-1,3 when used either alone or in combination with other insect repellents, may be combined with sun-screening agents such as benzal acetone oxalate butyl ester for the purpose of filtering out the harmful, skin-irritating rays of normal sunlight.

I claim:
2-ethyl-2-butyl propanediol-1,3.

SAMUEL W. TRIBIT.